Sept. 8, 1970 E. T. GETZ ET AL Re. 26,947

LOAD SUPPORTING STRUCTURES HAVING AUXILIARY MOUNTING FRAME MEANS

Original Filed Aug. 3, 1966 3 Sheets-Sheet 1

INVENTORS
EDWARD T. GETZ
MATTHEW PACAK

BY Teagno & Toddy

ATTORNEYS

INVENTORS
EDWARD T. GETZ
MATTHEW PACAK

BY Teagno & Toddy

ATTORNEYS

INVENTORS
EDWARD T. GETZ
MATTHEW PACAK

BY Teagno & Toddy

ATTORNEYS

United States Patent Office

Re. 26,947
Reissued Sept. 8, 1970

26,947

LOAD SUPPORTING STRUCTURES HAVING AUXILIARY MOUNTING FRAME MEANS

Edward T. Getz, Cleveland Heights, and Matthew Pacak, Solon, Ohio, assignors to Eaton Yale & Towne Inc., Cleveland, Ohio, a corporation of Ohio Original No. 3,363,943, dated Jan. 16, 1968, Ser. No. 569,872, Aug. 3, 1966. Application for reissue Feb. 4, 1969, Ser. No. 813,773

Int. Cl. A47c *27/14, 27/22*

U.S. Cl. 297—452 21 Claims

Matter enclosed in heavy brackets [ ] appears in the original patent but forms no part of this reissue specification; matter printed in italics indicates the additions made by reissue.

This invention relates to load supporting structures adaptable for use as vehicle seats and backs, furniture, crash pads, etc., or other cushion devices of this general nature. More specifically, this invention is directed to a composite load supporting structure including a unique internal frame reinforcement assembly and resilient material combined in a manner to provide a new and novel improved load supporting structure.

In the prior art, cushions or other seat constructions used as load supporting structures of this general type, did not take maximum advantage of the combination of the internal support structure and resilient material makup the cushion or seat. The spring or other internal reinforcement structure common in prior art structures were expensive and cumbersome and difficult to assemble. The springs or mounting structure were often covered and segregated from the resilient material providing the requisite softness for the structure. The prior art foamed cushion units were usually covered with appropriate covering material which had to be secured by a costly and time consuming method in which cover tie-down lines were threaded through the bottom portion of the structure to specially provided means on the bottom of the cover. The above discussed prior art structures were costly, complicated and incompatible with effective mass production requirements.

It is, accordingly, a major object of the present invention to provide a load supporting structure utilizing internal support means and foamed elastomeric material combined in a novel manner providing unexpected durability.

It is another object of the present invention to provide a load supporting structure of simple construction including a novel arrangement of foamed resilient material and cooperating internal support structure to which internal load transfer means and external covering material can readily be united.

Another object of the present invention is to provide a structure readily adaptable to any desired shape or size including internal frame means supporting centrally extending load transfer means, and elastomeric material surrounding said frame means.

Another important object of this invention is to provide a load supporting structure as noted in the next preceding paragraph wherein the load transfer means is composed of cantilevered mounted elements which extend into the area of greatest load on said structure for cooperatively transferring the load on said structure to said frame.

It is another object of the present invention to provide a load supporting structure of relatively simple construction including internal frame means and foamed elastomeric material having a molded contoured surface conforming to the desired shape of the load supporting structure and covered by appropriate material secured in place to a portion of said frame.

Another prime object of the present invention is to provide a unique internal frame and load transfer arrangement to be molded within foamed resilient material wherein is provided a rigid subframe having a bolster frame and mounting frame secured thereto with load transfer means secured to said mounting frame and extending in the central area of said structure.

Still further objects of this invention will become apparent upon a reading of the following detailed description of the present invention and annexed drawings in which.

Before explaining the present invention in detail, it is to be understood that the present invention is not limited in its application to the particular construction and arrangement of parts illustrated in the accompanying drawings since the invention is capable of other embodiments and of being practiced and carried out in various ways. Also, it is to be understood that the phraseology and terminology employed herein is for the purpose of description only and not of limitations.

Figure 1:
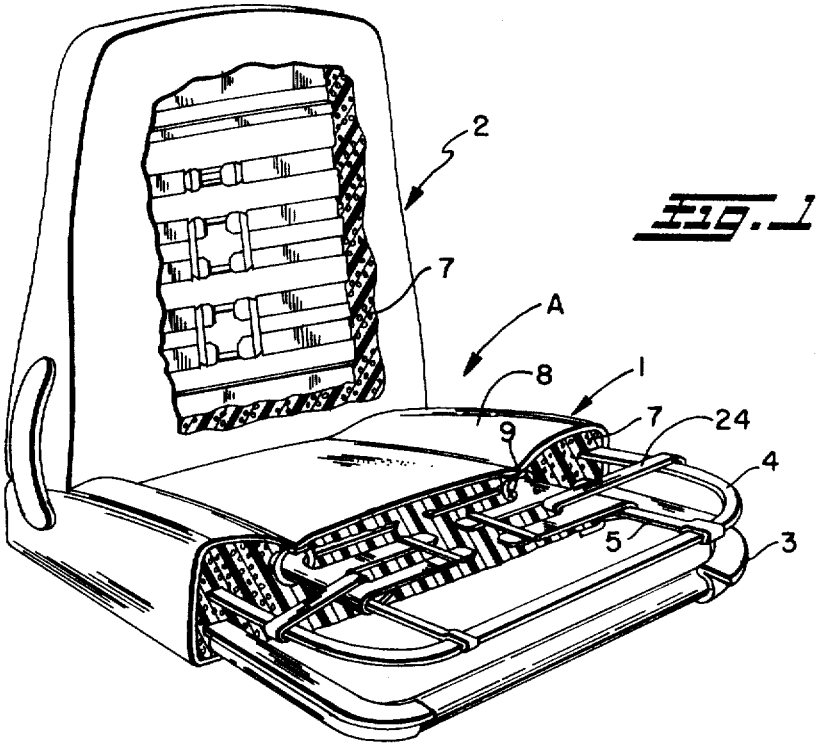
FIGURE 1 is a perspective view of one embodiment of the load supporting structures of this invention in the form of a seat showing the base and back portions in section with parts broken away to illustrate the internal construction of the seat.

Referring to the drawings, FIGURE 1 illustrates an embodiment of this invention for a new and novel load supporting construction, and particularly, illustrates a bucket type seat for use in vehicles. It will be obvious that the present invention is applicable to other vehicular seat constructions and forms and in other uses and constructions as household and office furniture, crash pads, benches, etc.

While the structures illustrated are simple, flexible and economical designs, it has been found through extensive testing by thousands of cycles of load application and release to load supporting constructions of this design that the cooperating resilient material and internal load supporting structure provides a construction with excellent durability, particularly for vehicle seats. Furthermore, the design of the present invention permits controlled consistency in the finished product which is essential for manufacture needs. The design of the present invention also permits a comfortable, pleasant supporting seat for a person using the structure.

The seat construction shown in FIGURE 1 and generally indicated by the letter A comprises a base portion 1 and a back portion 2 for supporting the buttocks and back of the passenger respectively. The internal load supporting structure of the respective base and back portions of the seat shown in FIGURE 1 are illustrated with somewhat different construction, but it is to be understood that both the back and base portions could utilize the same internal structure depending on the use and needs of the particular seat. Regarding the base portion internal structure, more clearly shown in FIGURE 2, the main or sub-base member 3 has supported therefrom bolster frame means 4 and mounting frame means 5 upon which is mounted load transfer means generally indicated as 6. The internal load supporting structure is surrounded by resilient material generally indicated as 7 which is bonded thereto. A suitable covering or upholstery material 8 is secured tightly around the resilient material for a finished load supporting structure. The main or subframe 3 can be made from flat steel, angle iron, or tubular material and is generally rectangular in shape.

Figure 5:
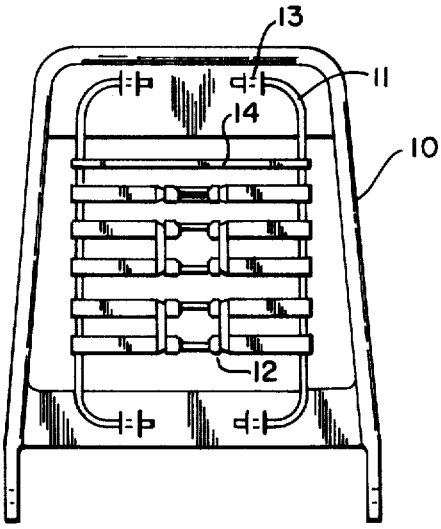
FIGURE 5 is a front elevational view of the load supporting structure for the seat back shown in FIGURE 1.

The corresponding back internal load supporting structures of FIGURES 1 and 5 utilizes a main or subframe 10 which has mounted thereon mounting means 11 which supports load transfer means generally indicated as 12. As in the corresponding seat base structure, the frame 10 of the back can be made from flat steel, angle iron, or tubular material, and the frame and load transfer means are surrounded by resilient material 7 bonded thereto. The resilient material 7 is a foam material, preferably polyurethane foam, or other similar elastomeric or rubber-like foamed material which can be bonded or secured to the frame members and load transfer means.

Figure 2:
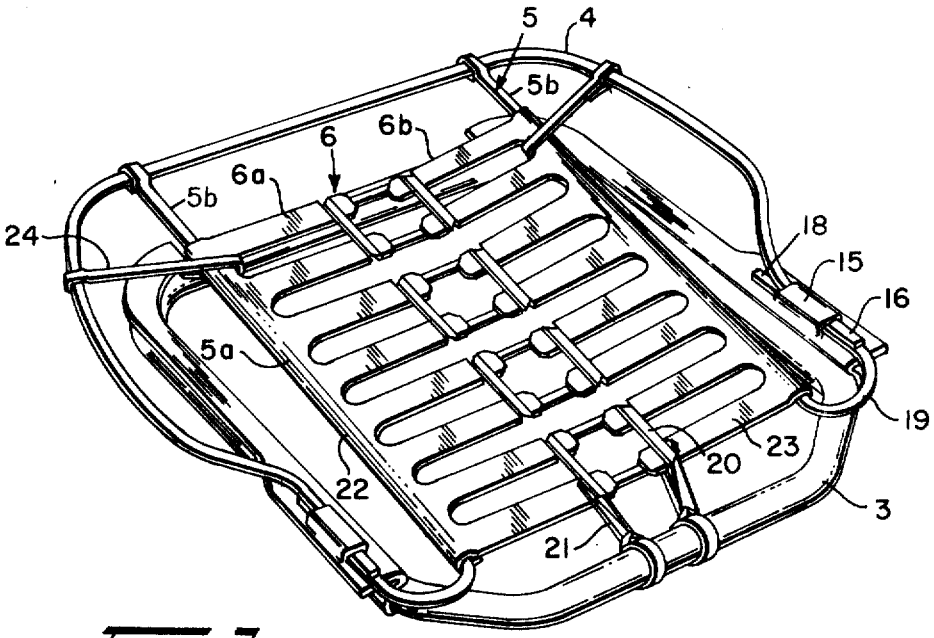
FIGURE 2 is a perspective view of the load supporting structure of the base portion of the seat shown in FIGURE 1.
Figure 3:
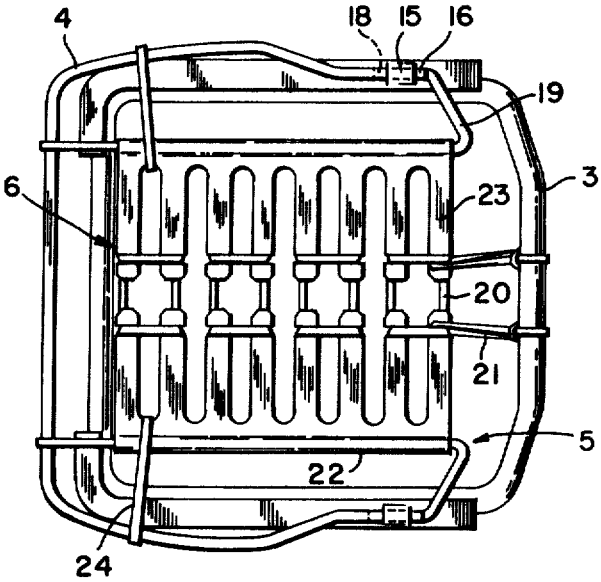
FIGURE 3 is a plan view of the load supporting structure of FIGURE 2.

In the seat construction of FIGURES 1–3, the rigid subframe 3 provides a base to which is secured the end portions 16 of the bolster frame 4 and the end portions 18 of the mounting frame 5. In the embodiment of FIG. 2, the ends 16 and 18 of bolster frame 4 and the mounting frame 5 respectively are arranged in overlying relationship, that is, one of the ends is placed on the other. Ends 16 and 18 are press-fitted into slot 15 provided in sub-frame 3. Securing means 15 in the form of a slot are provided for receiving the end portions 16 and 18, but other suitable securing means such as welds, rivets, etc. may be used. The bolster frame 4 extends from its point of attachment to the subframe 3 in a plane upwardly inclined from the plane of the subframe 3 so that the major portion of the bolster frame is vertically offset from the plane of the subframe. This offset structural relation of the bolster frame 4 to the subframe 3 is important for the purposes of providing a flexible soft feel to the user of the seat base as will be discussed in detail hereinafter. The mounting frame 5, as shown in FIGURES 1–3, consists of two members 5a and 5b, each extending from its point of attachment with the subframe securing means or slot 15 in a U-shaped bend 19 and thereafter extending generally longitudinally and laterally offset from both the subframe 3 and the bolster frame 4. In the embodiment of FIGURES 2 and 3, the mounting frame is connected at its forward end to the bolster frame 4. The inner connection of the bolster frame 4 and mounting frame 5 unitizes the internal load supporting structure, providing uniform feel and load supporting capabilities for the entire seat base. The load transfer means 6a and 6b are mounted respectively on mounting frame members 5a and 5b and extend generally transversely towards each other, but terminating in spaced relation to one another at the central area of the seat. The opposing load transfer means 6a and 6b are interconnected by resilient means 20, preferably rubber bands or strips, which tend to unitize the central load bearing supporting structure while permitting a desired degree of flexibility within the central area of the structure. The load transfer means 6a and 6b as illustrated, have a plurality of fingers connected by a common back or bank 22, but it is to be understood that the load transfer means could consist of individual fingers separately mounted to the mounting frame 5 or in pairs, etc., whatever the particular design needs require. As illustrated, the embodiments of FIGURES 2 and 3 utilizes resilient means 21 for interconnecting the rear load transfer means 23 and the subframe 3 and interconnecting means 24 is utilized between the bolster and mounting frames; the aforementioned interconnecting means 21 and 24 are for the purpose of unitizing the internal load supporting structure. The resilient means 21 is separate from the aforementioned resilient means 20 between opposed fingers, and as illustrated, resilient means 21 is mounted at one end to the unsupported end of the finger 23 adjacent sub-frame 3 (see FIG. 2).

Figure 4:
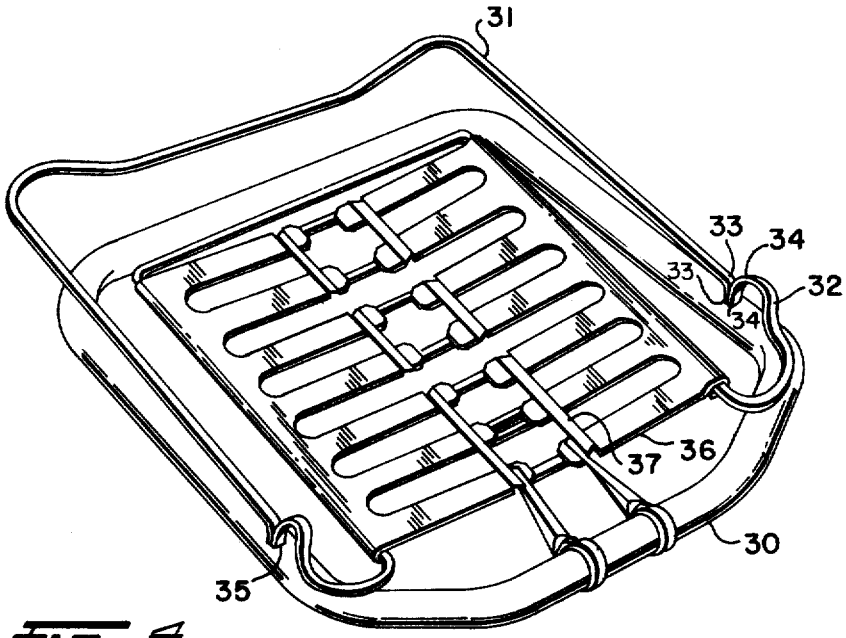
FIGURE 4 is a perspective view of a modified form of a load supporting structure for a seat base.

The modified seat base internal supporting structure of FIGURE 4 utilizes a sub-base 30 and bolster frame 31 similar to that structure of the seat base of FIGURES 2 and 3. However, mounting frame 32 is not interconnected with the bolster frame 31, but is mounted from the subframe 30 in cantilevered fashion so that the front portion of the mounting frame 32 is unsupported. Both the bent-over ends 33 and 34 of the respective bolster frame 31 and mounting frame 32 are positioned adjacent each other and are received in a groove or opening 35 of the subframe 30. The end portions 34 of the mounting frame 32 extend vertically or at a substantial angle from the openings 35, and are provided with a vertical arcuate configuration or portion adjacent the openings 35 as seen in FIGURE 4. The arcuate portions are necessary to relieve stress concentrations in the end portions upon normal loading of the support structure. It has been found that providing such an arcuate portion in the mounting frame adjacent each opening 35 of the subframe 30 is necessary to prevent undesired fatiguing of the mounting frame at the junction of its end portion 34 with the remainder of the mounting frame which lies generally parallel to the plane of the subframe 30. The modified design of FIGURE 4 is particularly adaptable in structures requiring a softer feel at the front portion of the structure; the "soft" feel of the structure made with an internal load supporting structure of FIGURE 4 is brought about by the cantilevered mountings of bolster frame 31 and mounting frame 32 from subframe 30 wherein the bolster frame and mounting frame front portions are free to move downwardly towards the plane of the subframe upon loading in the front or central area. As in the structure of FIGURES 2 and 3, the opposing load transfer means generally indicated as 36 are interconnected by resilient means 37 which may take the form of rubber bands. The load transfer means 36 are illustrated as being joined by a common bank at their common rear portions, but it is to be understood that the load transfer means could be made of a plurality of spaced singular elements or any combination of elements depending on the design and production needs.

FIGURE 5 illustrates the seat back internal load supporting structure of FIGURE 1. The subframe 10 is provided with mounting slots 13 for receiving the end portions of mounting frames 11. The mounting frames 11 support the load transfer means generally indicated as 12 in the same manner as in the seat base structures previously described. The opposing load transfer means terminate in spaced relationship to one another and are interconnected by resilient means usually taking the form of rubber bands. In the internal structure arrangement of FIGURE 5 the mounting frames 11 have an interconnecting portion 14 made of the same material as the mounting frames, for additional securement area to receive the hog-ring or suitable connecting means securing the cover material in place.

Figure 6:
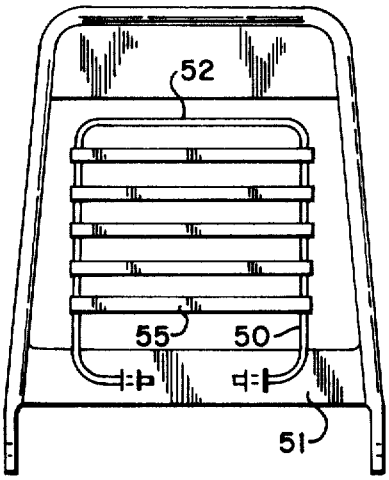
FIGURE 6 is a front elevational view of a modified form of load supporting structure for a seat back.

The seat back internal load supporting structure of FIGURE 6 utilizes a cantilevered mounting of the mounting frame 50 from the sub-frame 51. This permits the unsupported upper end 52 of the mounting frame 50 to move relative to the subframe 51 in the upper region of the seat frame and provides a soft feel for the user in this area. In the illustrated embodiment of FIGURE 6, the load transfer means takes the form of bands 55 mounted at their respective ends to the mounting frame 50.

Figure 7:
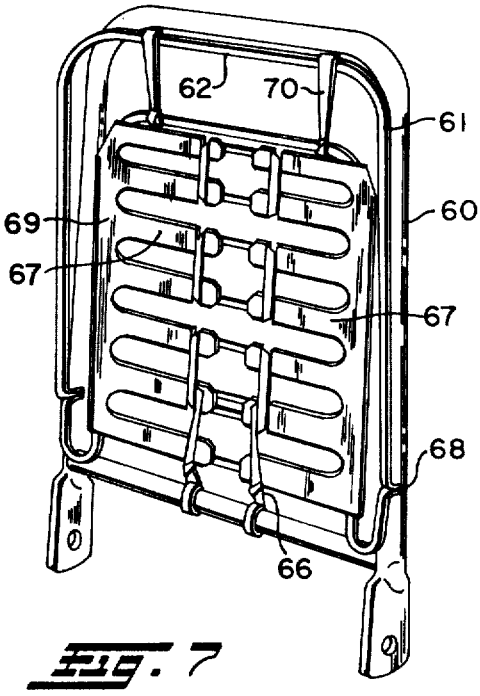
FIGURE 7 is a front elevational view of another modified form of a load supporting structure for a seat back.

The seat back construction illustrated in FIGURE 7 utilizes a bolster frame in conjunction with the mounting frame and load transfer means similar to that of the seat base structure of FIGURE 4. The bolster frame 61 is mounted from the subframe 60 in cantilevered fashion so that the upper portion 62 of the bolster frame 61 is vertically spaced from the subframe permitting relative movement thereto upon loading of the seat back in its upper portion. The mounting frame 65 is secured to the subframe 60 at 68 and extends generally longitudinally of the seat back structure in a U-shaped configuration. Mounted from the lateral sides of the mounting frames 65 are load transfer means 67 in the form of "fingers" or elements, having a common base or back portion 69 mounted on the said mounting frame. It is to be understood that the load transfer means 67 could take the from of singular elements mounted from the mounting frame means 65 or in combination of two or three elements joined together and mounted from the mounting frame 65. The opposing load transfer means 67 have their unsupported ends interconnected by resilient means 66 usually in the form of rubber bands. In the back internal structure illustrated, the bolster and mounting frame means are interconnected by resilient means 70.

In all of the seat base and back constructions of FIGURES 1–7, the mounting frame means plays a dual function in (1) supporting the load transfer means, and (2) receiving attaching means for securing the upholstery or cover material 8 in place in the finished seat structure. As most clearly shown in FIGURE 1, the cover or upholstery material 8 is secured to the mounting frame by means of a "hog ring" connection 9 or other suitable connecting means. Securement of the cover to the internal load supporting structure in the manner described is particularly desirable for mass production since it permits a rapid and effective means for securing the cover in place.

The structures of the present invention provide an unexpected resilient or "soft" feel to the user because of their strcutural arrangement wherein the mounting frame is offset from the corresponding portions of the bolster and subframe for relative movement thereto. The seat base and back structures of the present invention are readily adaptable to be made firm or solid in selected portions by the use of bands extending transversely and mounted at their opposite ends to the mounting frame as in the FIGURE 6 structure. Utilization of such transverse bands can be in conjunction with oppositely facing, split "finger" type of load transfer means as in FIGURES 1–5 and 7, and would not detract from the over-all comfort of the structures because the mounting frame would provide the desired resiliency by its ability to move relative the bolster and subframes within the surrounding elastomeric foamed material. The versatility of the structures of the present invention lend them to adaptation to many designs in addition to those illustrated, including bench type and support structures.

The structures made in accordance with the present invention have shown unexpected durability in thorough testing programs. The structures described have excellent characteristics of comfort and a pleasant "feel" to the person sitting on the structure. The unexpected performance of the simple load supporting structure made in accordance with the present invention make them highly desirable structures for use in mass production of load supporting units because of their durability, long life, comfort and flexibility of design. The basic combination of the structures with foamed resilient material in surrounding relationship to internal support and frame members is readily adaptable to many sizes and shapes of loads supporting structures.

While the present invention has been described for particular use within the base and back portions of a seat, it is to be understood that the invention could be utilized in other structures as bench-type seat often utilized in the rear seat of an automobile. It is also to be understood that the preferred embodiments of the present invention have been described herein in great detail and that certain modifications and changes may be made by those skilled in the art to which it relates and it is intended to cover hereby all changes, adaptations, and modifications falling within the scope of the appended claims.

Having described our invention, we claim:

1. Load supporting structure comprising:

frame means including a rigid subframe, and a bolster frame and mounting frame both secured to said subframe, at least one of said bolster and mounting frames having portions spaced from at least a portion of the subframe and movable relative to said subframe upon application of load, load transfer means supported by said mounting frame, elastomeric material *surrounding said mounting frame and said load transfer means and* bonded to at least [the underside] *a portion* of said *mounting frame and said* load transfer means, said elastomeric material, load transfer means and said bolster and mounting frames cooperatively transferring any load on said structure to said subframe.

2. The load supporting structure as set forth in claim 1 wherein:

said bolster and mounting frames are supported solely at one end to said subframe in cantilevered fashion.

3. The load supporting structure as set forth in claim 1 wherein:

said load transfer means is composed of first and second portions supported solely at one end to opposite sides of said mounting frame and extending transversely towards each other and terminating in spaced relation to one another in the same plane.

4. The load supporting structure as set forth in claim 3 wherein:

both of said first and second load transfer means portions include a plurality of spaced elements, the unsupported ends of which are interconnected by resilient means.

5. A load supporting structure comprising:

frame means including a rigid subframe and a mounting frame secured in a flexible manner to said subframe for relative movement thereto upon application of load, said mounting frame secured within said subframe with portions of said mounting frame being inwardly offset from the corresponding portions of said subframe, load transfer means supported on said mounting frame, elastomeric material *surrounding said mounting frame and said load transfer means and* bonded to at least [the underside] *a portion* of said *mounting frame and said* load transfer means, said elastomeric material, load transfer means, and said mounting frame cooperatively transferring any load on said structure to said subframe.

6. The load supporting structure as set forth in claim 5 wherein:

said load transfer means is composed of first and second portions supported solely at one end to said mounting frame at opposite sides of said structure and extending towards each other and terminating in spaced relation to one another in the same plane.

7. The load supporting structure as set forth in claim 6 wherein:

both of said first and second load transfer means portions include a set of spaced elements, the unsupported ends of which are interconnected by resilient means.

8. The load supporting structure as set forth in claim 5 wherein:

said mounting frame is supported solely at one end to said subframe in cantilevered fashion.

9. The load supporting structure as set forth in claim 8 wherein:

said frame means includes a bolster frame supported solely at one end to said subframe in cantilevered fashion and having its major portion offset from said subframe.

10. In a seat construction, base and back sections each having frame means including a rigid subframe and a mounting frame secured to the subframe, said mounting frame having portions inwardly spaced from said subframe, load transfer means supported by said mounting frame, elastomeric material *surrounding said mounting frame and said load transfer means and* bonded to at least [the underside] *a portion* of said *mounting frame and said* load transfer means, said elastomeric material, load transfer means, and said mounting frame cooperatively transferring any load on said structure to said subframe.

11. In a seat construction according to claim 10 in which:

said mounting frame is supported solely at one end to said subframe in cantilevered fashion.

12. In a seat construction according to claim 11 in which:

the base and back frame means include a bolster frame secured to and having its major portion offset from the plane of said subframe.

13. In a seat construction according to claim 10 in which:

said load transfer means is composed of first and second portions supported solely at one end to said mounting frame at opposite sides of said structure and extending towards each other and terminating in spaced relation to one another in the same plane.

14. In a load supporting structure as set forth in claim 1 wherein:

end portions of said bolster and mounting frames are positioned adjacent each other within an opening of said rigid subframe for securing said bolster and mounting frames to said rigid subframe.

15. In a load supporting structure as set forth in claim 14 wherein:

said end portions extend vertically at a substantial angle to the plane of said rigid subframe.

16. In a load supporting structure as set forth in claim 14 wherein:

a portion of said mounting frame end portions adjacent said opening extend vertically in arcuate configuration to relieve stress concentrations in said end portions upon loading of said structure.

17. The load supporting structure as set forth in claim 1 wherein:

the major portion of said mounting frame is spaced from said sub-frame and bolster frame, and means inter-connect the spaced portions of said bolster frame and mounting frame.

18. The load supporting structure as set forth in claim 1 wherein:

said elastomeric material surrounds said frame means and is shaped to the desired form of the structure, said structure is covered by upholstery material which is secured to said mounting frame by means extending through said elastomeric material.

19. In the seat construction according to claim 10 in which:

said elastomeric material surrounds said mounting frame and is contoured to conform to the desired seat configuration having a centrally located depressed area generally conforming to the human anatomy, said mounting frame being coextensive with the periphery of said depressed area, said elastomeric material covered by selected upholstery material, and means securing said upholstery material to said mounting frame through said elastomeric material.

*20. A load supporting structure comprising:*

*frame means including a rigid subframe and a mounting frame secured in a flexible manner to said subframe for relative movement thereto upon application of load,*

*load transfer means supported on said mounting frame,*

*elastomeric material surrounding said mounting frame and said load transfer means and bonded to at least a portion of said mounting frame and said load transfer means,*

*said elastomeric material, load transfer means and said mounting frame cooperatively transferring any load on said structure to said subframe.*

*21. The invention of claim 20 wherein said elastomeric material is bonded to at least the underside of said load transfer means.*

References Cited

The following references, cited by the Examiner, are of record in the patented file of this patent or the original patent.

UNITED STATES PATENTS

| | | | |
|---|---|---|---|
| 3,081,077 | 3/1963 | Sudman | 267—111 |
| 3,084,980 | 4/1963 | Lawson | 297—455 |
| 3,112,987 | 12/1963 | Griffiths | 264—45 |
| 3,140,084 | 7/1964 | Lawson | 267—111 |
| 3,208,085 | 9/1965 | Grimshaw | 5—345 |
| 3,235,245 | 2/1966 | Castelet | 267—103 |
| 3,252,735 | 7/1966 | Smith | 297—452 |
| 3,259,435 | 7/1966 | Jordan | 297—455 |
| 3,264,034 | 8/1966 | Lawson | 297—456 |
| 3,266,844 | 8/1966 | Amstutz | 297—452 |

CASMIR A. NUNBERG, Primary Examiner

U.S. Cl. X.R.

297—458